United States Patent
Di et al.

(10) Patent No.: US 10,364,106 B2
(45) Date of Patent: Jul. 30, 2019

(54) STOPPING DEVICE FOR CONVEYING PROCESS OF OBJECT AND CONVEYOR SYSTEM

(71) Applicants: BOE TECHNOLOGY GROUP CO., LTD., Beijing (CN); BEIJING BOE DISPLAY TECHNOLOGY CO., LTD., Beijing (CN)

(72) Inventors: Peng Di, Beijing (CN); Lizhu Yu, Beijing (CN); Hongtao Ma, Beijing (CN); Xuemei Li, Beijing (CN); Qi Chen, Beijing (CN); Wei Zhao, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/554,943

(22) PCT Filed: Jan. 24, 2017

(86) PCT No.: PCT/CN2017/072440
§ 371 (c)(1),
(2) Date: Aug. 31, 2017

(87) PCT Pub. No.: WO2017/177748
PCT Pub. Date: Oct. 19, 2017

(65) Prior Publication Data
US 2019/0023499 A1    Jan. 24, 2019

(30) Foreign Application Priority Data

Apr. 11, 2016 (CN) .................... 2016 2 0300337 U

(51) Int. Cl.
*B65G 47/74* (2006.01)
*B65G 47/88* (2006.01)

(52) U.S. Cl.
CPC .............................. *B65G 47/8823* (2013.01)

(58) Field of Classification Search
None
See application file for complete search history.

(56) References Cited

U.S. PATENT DOCUMENTS 5,168,976 A * 12/1992 Kettelson ............. B23Q 16/008
                                                        193/35 A
5,211,276 A *  5/1993 Clopton ............. B65G 47/8823
                                                        193/35 A
6,234,292 B1   5/2001 Schut

FOREIGN PATENT DOCUMENTS

CN          102190157 A       9/2011
CN          102381534 A       3/2012
                (Continued)

OTHER PUBLICATIONS

International Search Report and Written Opinion for Application No. PCT/CN2017/072440, dated Apr. 28, 2017, 14 Pages.

*Primary Examiner* — Kavel Singh
(74) *Attorney, Agent, or Firm* — Brooks Kushman P.C.

(57) ABSTRACT

A stopping device for a conveying process of an object and a conveyor system are provided. The stopping device includes: a pedestal; a driving structure rotatably connected to the pedestal through a first spindle; a stopping arm rotatably connected to the pedestal through a second spindle; and a linkage rod connected between the driving structure and the stopping arm. The driving structure is configured to drive the linkage rod to move, so that the linkage rod drives the stopping arm to rotate about the second spindle between a first position and a second position.

17 Claims, 3 Drawing Sheets

(56) References Cited

FOREIGN PATENT DOCUMENTS

| | | | |
|---|---|---|---|
| CN | 102502248 | A | 6/2012 |
| CN | 103673869 | A | 3/2014 |
| CN | 104118725 | A | 10/2014 |
| CN | 104960912 | A | 10/2015 |
| CN | 105460593 | A | 4/2016 |
| CN | 205471556 | U | 8/2016 |

* cited by examiner

STOPPING DEVICE FOR CONVEYING PROCESS OF OBJECT AND CONVEYOR SYSTEM

CROSS-REFERENCE TO RELATED APPLICATIONS

This application is the U.S. national phase of PCT Application No. PCT/CN2017/072440 filed on Jan. 24, 2017, which claims priority to Chinese Patent Application No. 201620300337.9 filed on Apr. 11, 2016, which are incorporated herein by reference in their entireties.

TECHNICAL FIELD

The present disclosure relates to a field of manufacturing a product, and in particular to a stopping device for a conveying process of an object and a conveyor system.

BACKGROUND

Because a product usually needs to be processed at a plurality of workplaces in the field of manufacturing the product, it is a necessary procedure to convey members of the product.

For example, during manufacturing a liquid crystal display, conveying a panel needs using a cassette-like device. In the process of conveying, the cassette-like device needs to be moved from one conveying section to a next conveying section. In case that another cassette-like device exists in the next conveying section, a stopping device is needed to prevent the cassette-like device from being moved to the next conveying section, thereby to prevent the cassette-like devices from colliding with each other.

In the related art, the stopping device for preventing the cassette-like device from being further moved is of an elevation type, and is arranged under the conveying section for conveying the cassette-like device. However, an installation of the stopping device of the elevation type may be restricted by an installation space, and additionally, the stopping device may interfere with the cassette-like device. Hence, an effect of conveying a panel may be adversely affected.

SUMMARY

An object of the present disclosure is to provide a stopping device for a conveying process of an object and a conveyor system, so as to solve technical problems in the related arts that an installation room of the stopping device having an elevatory driving shaft is restricted and interference may easily occur between the stopping device and the object being conveyed.

The present disclosure provides a stopping device for a conveying process of an object. The stopping device includes: a pedestal; a driving structure rotatably connected to the pedestal through a first spindle; a stopping arm rotatably connected to the pedestal through a second spindle; and a linkage rod connected between the driving structure and the stopping arm, wherein the driving structure is configured to drive the linkage rod to move, so that the linkage rod drives the stopping arm to rotate about the second spindle between a first position and a second position.

Optionally, in the above stopping device, the driving structure includes a cylinder, and the linkage rod is fixedly connected to a piston of the cylinder.

Optionally, in the above stopping device, the linkage rod is rotatably connected to the stopping arm through a third spindle.

Optionally, in the above stopping device, the stopping arm includes a first sub-arm and a second sub-arm between which an angle is formed, and the second spindle is arranged at a position where the first sub-arm is connected to the second sub-arm.

Optionally, in the above stopping device, the angle is larger than 90 degrees.

Optionally, in the above stopping device, the angle is 135 degrees.

Optionally, in the above stopping device, an end of the first sub-arm away from the second sub-arm is rotatably connected to the linkage rod through the third spindle.

Optionally, in the above stopping device, the number of the linkage rod is one; an axis of a body of the linkage rod is an identical straight line; and in the case that the stopping arm is located at the first position, the second sub-arm is in a first state in which the second sub-arm is parallel to the linkage rod, and in the case that the stopping arm is located at the second position, the second sub-arm is in a second state in which the second sub-arm is perpendicular to the second sub-arm in the first state.

Optionally, in the above stopping device, the stopping device further includes an angle detector arranged at a position where the linkage rod is connected to the stopping arm and including a first pointer and a second pointer, wherein the first pointer is arranged to be in one of a first state and a second state, and in the first state, the first pointer is fixed onto a fourth spindle, and in the second state, the first pointer is rotatable about the fourth spindle; the second pointer is fixedly connected to the stopping arm, and in the case that the linkage rod drives the stopping arm to rotate about the second spindle between the first position and the second position, the second pointer synchronously rotates about the fourth spindle.

Optionally, in the above stopping device, the stopping device further includes an alarm, wherein a position sensor is arranged on the first pointer; and in the case that a difference between an angle indicated by the second pointer and an angle indicated by the first pointer is larger than a predetermined angle value, the position sensor outputs a triggering signal to the alarm.

Optionally, in the above stopping device, the angle detector further includes a third pointer fixedly connected to the linkage rod, and in the case that the driving structure drives the linkage rod to move, the third pointer synchronously rotates about the fourth spindle.

Optionally, in the above stopping device, an axis of the third spindle coincides with an axis of the fourth spindle.

A conveyor system is also provided in the present disclosure, and the conveyor system includes a plurality of conveying structures for conveying an object, and the above stopping device.

At least one of the above technical solutions of the embodiments of the present disclosure has the following beneficial effects: in the stopping device provided in the present disclosure, due to the driving structure and the linkage rod, the stopping arm may be driven to rotate about the second spindle in a plane, when the stopping device is installed in the conveyor system, this plane may be arranged parallel to a conveying plane. As compared with the stopping device of the elevation type having the driving shaft in the related arts, the spindle of the stopping device in the embodiments of the present disclosure is arranged to be perpendicular to the conveying plane, and thus no additional room is required. In addition, the stopping device may move gradually into an object conveying region, and thus no interference may be caused to the object being conveyed.

BRIEF DESCRIPTION OF THE DRAWINGS

In order to illustrate technical solutions of embodiments of the present disclosure more clearly, drawings related in description of the embodiments of the present disclosure will be introduced hereinafter briefly. Obviously, the following drawings merely show some embodiments of the present disclosure, and based on these drawings, a person skilled in the art may obtain other drawings without any creative effort.

DETAILED DESCRIPTION

In order to make technical problems to be solved, technical solutions and advantages of the present disclosure more clear, the embodiments of the present disclosure will be described hereinafter in combination with drawings in details.

Figure 1:
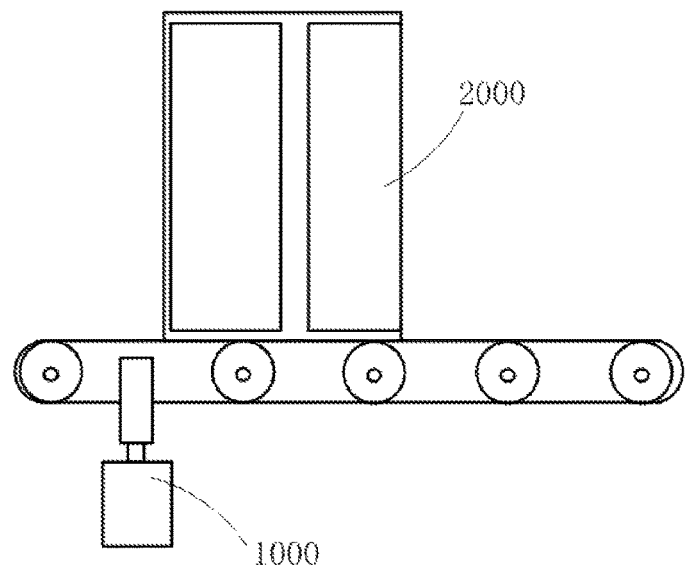
FIG. 1 is a structural schematic view of a stopping device used in a conveyor system in the related arts.

FIG. 1 is a structural schematic diagram of a stopping device used in a conveyor system in the related arts. As shown in FIG. 1, when conveying a panel in the process of manufacturing a liquid crystal display, a cassette-like device 2000 needs to be moved from one conveying section to a next conveying section. When another cassette-like device 2000 exists in the next conveying section, a stopping device 1000 is needed to stop the cassette-like device 2000 from further moving toward the next conveying section, so as to prevent the cassette-like devices from colliding with each other. The stopping device 1000 in the related art used for preventing further movement of the cassette-like device 2000 is of an elevation type, and is arranged under the conveying section for conveying the cassette-like device 2000. When the cassette-like device 2000 is normally moving between the conveying sections, a driving shaft for the stopping device 1000 is in a contracted state. In case that it is necessary to prevent the cassette-like device 2000 from further moving toward the next conveying section, the driving shaft may be elevated vertically, so as to prevent stop further movement of the cassette-like device 2000.

However, an installation of the stopping device 1000 of the elevation type having the driving shaft in the related art may be restricted by installation space, and the stopping device 1000 may possibly interfere with the cassette-like device 2000, so an effect of conveying a panel may be adversely affected.

The present disclosure provides a stopping device used in a conveying process of an object. The stopping device includes a pedestal; a driving structure rotatably connected to the pedestal through a first spindle; a stopping arm rotatably connected to the pedestal through a second spindle; and a linkage rod connected between the driving structure and the stopping arm. The driving structure is configured to drive the linkage rod to move, so that the linkage rod drives the stopping arm to rotate about the second spindle between a first position and a second position.

In the stopping device provided in the embodiments of the present disclosure, a movement of the stopping arm driven by the driving structure is changed to a rotation about the second spindle due to a transfer function of the linkage rod, i.e., to rotate about the second spindle in a plane. Based on this principle, when the stopping device is used in a conveyor system and the plane is arranged to be parallel to a plane in which an object is conveyed, the stopping arm may be moved into or out of a conveying region while rotating in the plane. Because, as compared with the stopping device of the elevation type having the driving shaft in the related arts, the spindle of the stopping device in the embodiments of the present disclosure is arranged to be perpendicular to the plane in which an object is conveyed, no additional space is required for the spindle. Further, because the stopping device may move gradually into the conveying region, the stopping device may not interfere with the object being conveyed.

Figure 2A:
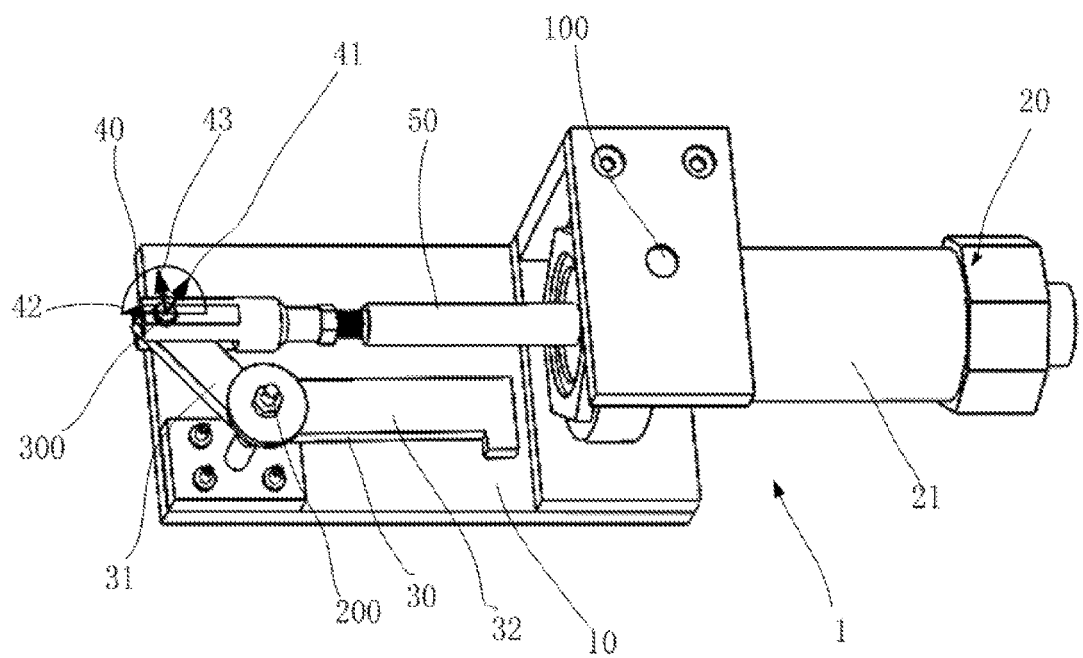
FIG. 2A is a schematic view of a stopping device in a first state provided in embodiments of the present disclosure.
Figure 3:
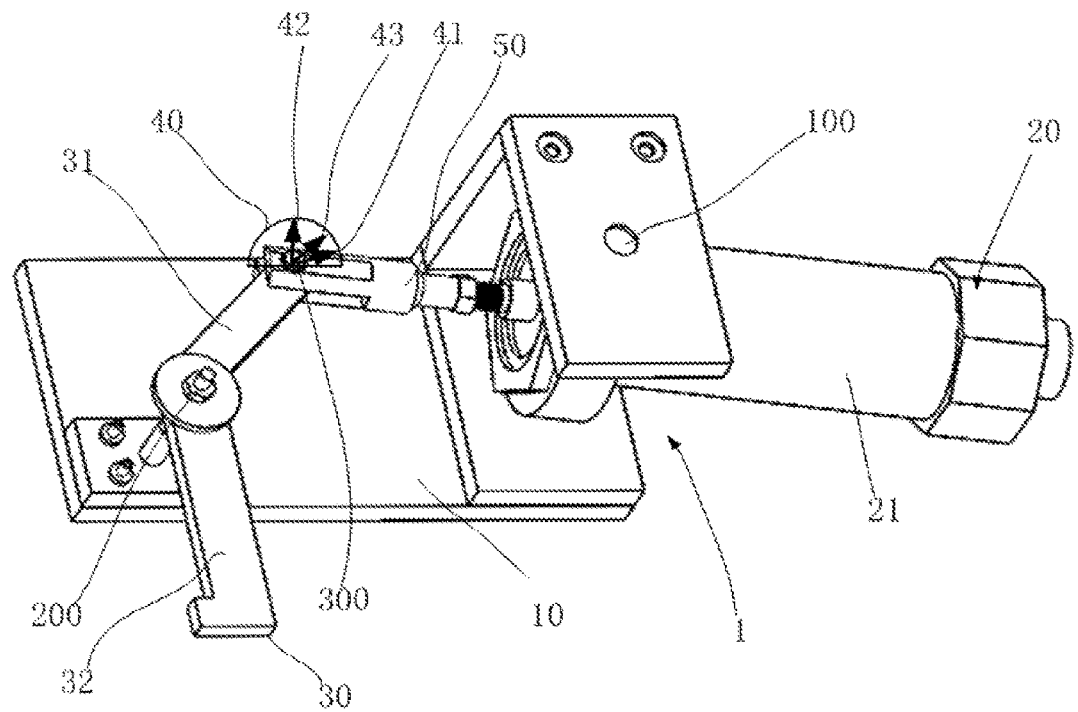
FIG. 3 is a schematic view of the stopping device in a second state provided in the embodiments of the present disclosure.

FIG. 2A and FIG. 3 are schematic views of a stopping device in a first state and in a second state provided in embodiments of the present disclosure, respectively. Referring to FIGS. 2A and 3, the stopping device 1 of the embodiments of the present disclosure includes: a pedestal 10; a driving structure 20 rotatably connected to the pedestal 10 through a first spindle 100, wherein a rotatable connection between the driving structure 20 and the pedestal 10 makes the driving structure 20 be rotatable about the first spindle 100 relative to the pedestal 10; a stopping arm 30 rotatably connected to the pedestal 10 through a second spindle 200, wherein a rotatable connection between the stopping arm 30 and the pedestal 10 makes the stopping arm 30 be rotatable about the second spindle 200 relative to the pedestal 10; and a linkage rod 50 connected between the driving structure 20 and the stopping arm 30.

In the embodiments of the present disclosure, the stopping arm 30 includes a first sub-arm 31 and a second sub-arm 32 with an angle being formed between the first sub-arm 31 and the second sub-arm 32, and the second spindle 200 is arranged at a position at which the first sub-arm 31 is connected to the second sub-arm 32. In addition, an end of the first sub-arm 31 away from the second sub-arm 32 is rotatably connected to the linkage rod 50 through a third spindle 300.

Figure 2B:
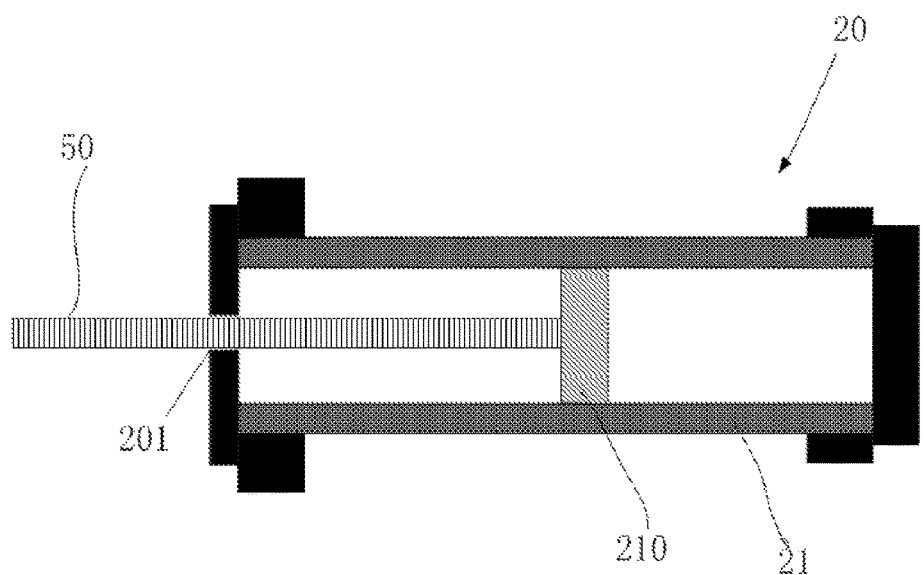
FIG. 2B is a sectional schematic view of a driving structure provided in the embodiments of the present disclosure.

FIG. 2B is a sectional schematic view of a driving structure provided in the embodiments of the present disclosure. As shown in FIG. 2B, the driving structure 20 includes a cylinder 21 which includes a piston 210, and the linkage rod 50 is fixedly connected to the piston 210 of the cylinder 21. A movement of the piston 210 is controlled by an internal air-pressure in the cylinder 21, and the movement of the piston 210 drives the linkage rod to move and thereby to change a stretch length of the rod-like linkage 50 relative to a cylinder port 201. In some embodiments of the present disclosure, one linkage rod 50 is provided, and an axis of a body of the linkage rod 50 is located in an identical straight line.

By providing the above-mentioned structure, when the internal air-pressure in the cylinder 21 is changed and the cylinder 21 is caused to rotate about the first spindle 100, the stretch length of the linkage rod 50 relative to the cylinder port 201 may be changed and a swinging angle of the linkage rod 50 relative to the pedestal 10 may be changed. Since the linkage rod 50 is connected to the first sub-arm 31 merely through the third spindle 300, the change in the stretch length and the change in the swing angle of the linkage rod 50 relative to the pedestal 10 may drive the first sub-arm 31 to move. Since the first sub-arm 31 is connected to the pedestal 10 through the second spindle 200, the first sub-arm 31 may rotate about the second spindle 200 accordingly. The second sub-arm 32 is formed integrally with the first sub-arm 31. Therefore, the second sub-arm 32 may rotate through different positions together with the rotation of the first sub-arm 31, so as to be protruded and stop conveying the object.

As shown in FIG. 2A, when the second sub-arm 32 of the stopping arm 30 in the stopping device 1 provided in the present disclosure is not protruded (i.e., at a first position shown in FIG. 2A), i.e., when the stopping device 1 is in a standby state, the second sub-arm 32 is retracted to be above the pedestal 10 and parallel to the linkage rod 50. At this position, the linkage rod 50 is in a state having a maximum stretch length relative to the cylinder port 201, and the axis of the cylinder 21 and an axis of the linkage rod 50 are in an identical straight line. As shown in FIG. 3, when the internal air-pressure in the cylinder 21 decreases, the stretch length of the linkage rod 50 relative to the cylinder port 201 is changed, so as to drive the first sub-arm 31 to rotate about the second spindle 200. Meanwhile, the cylinder 21 is rotated about the first spindle 100, so that the rotation of first sub-arm 31 about the second spindle 200 is more flexible. The first sub-arm 31 rotates about the second spindle 200 in a clockwise direction, and a state of the second sub-arm 32 is switched from a first state shown in FIG. 2A in which the second sub-arm 32 is parallel to the linkage rod 50 (i.e., the first position) into a second state shown in FIG. 3. In the second state, the stopping arm 30 is arranged at the second position, wherein the first position of the stopping arm 30 is perpendicular to the second position of the stopping arm 30. At this state, the second sub-arm 32 may be protruded relative to the pedestal 10, and be moved into the conveying region, so as to stop conveying the object on the conveying section.

A rotation procedure of the stopping arm 30 from the second position to the first position is a reverse procedure of the stopping arm 30 from the first position to the second position, and thus will not be described herein.

Further, the angle between the first sub-arm 31 and the second sub-arm 32 is larger than 90 degrees, so as to facilitate a rotation between the cylinder 21 and the first sub-arm 31. Optionally, the angle between the first sub-arm 31 and the second sub-arm 32 may be 135 degrees.

The rotation of the first sub-arm 32 about the second spindle 200 is performed in a plane, and this plane may be arranged to be parallel to the plane in which the object is conveyed, i.e., the second spindle 200 is arranged to be perpendicular to the plane in which the object is conveyed. As compared with the stopping device of the elevation type having the driving shaft in the related arts, the spindle of the stopping device in the present disclosure is arranged to be perpendicular to the plane in which an object is conveyed, no additional space is required for the spindle. Further, because the stopping device may move gradually into the conveying region, the stopping device may not interfere with the object being conveyed.

In some other embodiments of the present disclosure, the stopping device 1 of the present disclosure may further include an angle detector 40. As shown in FIGS. 2A and 3, the angle detector 40 is arranged on the third spindle 300 where the linkage rod 50 is connected to the first sub-arm 31.

Figure 4:
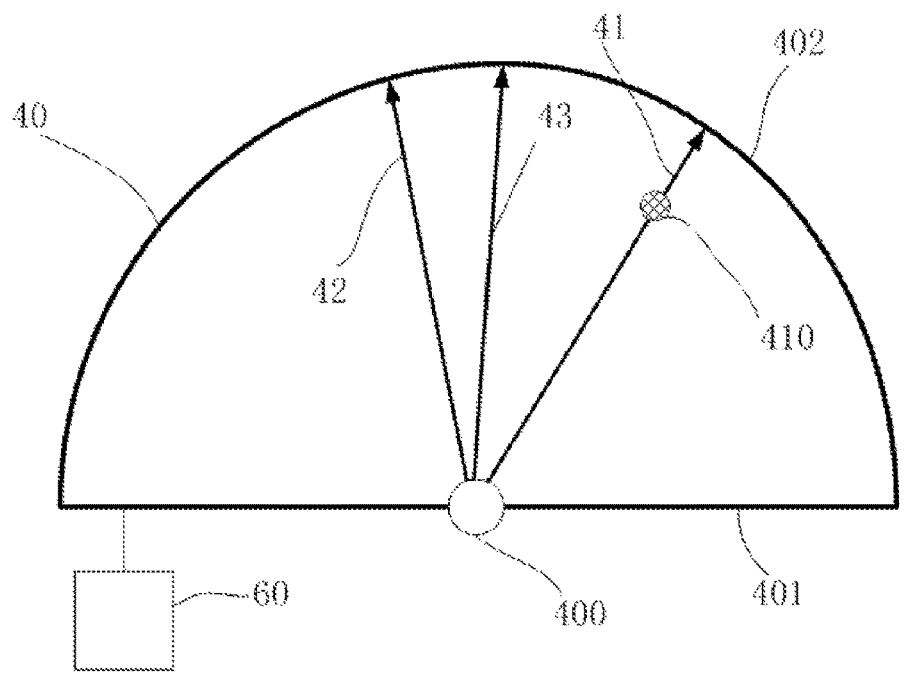
FIG. 4 is a structural schematic view of an angle detector provided in the embodiments of the present disclosure.
Figure 5:
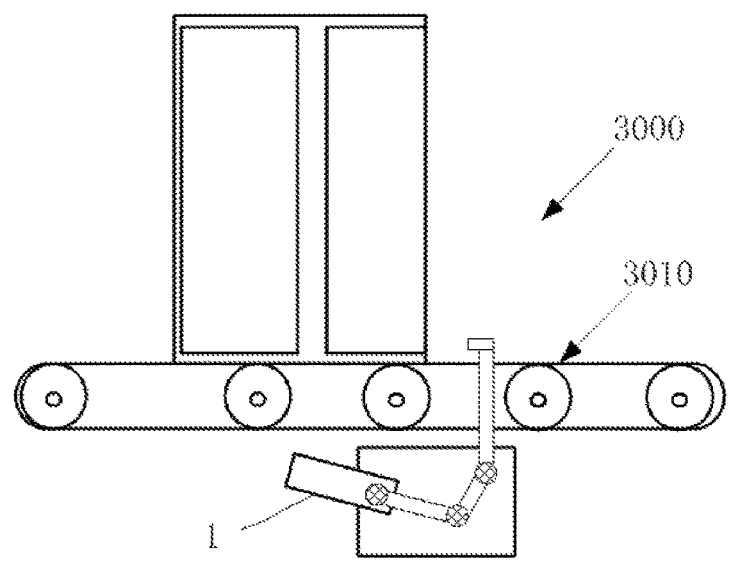
FIG. 5 is a schematic view of a conveyor system provided in the embodiments of the present disclosure.

FIG. 4 is a structural schematic view of an angle detector 40 provided in the embodiments of the present disclosure. As shown in FIGS. 2A, 3 and 4, the angle detector 40 includes a first pointer 41 and a second pointer 42. The first pointer 41 may be configured to be in a first state in which it is fixed to a fourth spindle 400 and a second state in which it is rotatable about the fourth spindle 400. The second pointer 32 is fixedly connected to the first sub-arm 31 and is rotatable about the fourth spindle 400.

In some embodiments of the present disclosure, an axis of the third spindle 300 may coincide with an axis of the fourth spindle 400 about which the first pointer 41 and the second pointer 42 may rotate. When the linkage rod 50 drives the first sub-arm 31 to rotate about the second spindle 200, the first sub-arm 31 may rotate relative to the third spindle 300, and thereby the second pointer 42 may synchronously rotate about the fourth spindle 400.

A position of the first pointer 41 is adjustable and the first pointer 41 is rotatably connected to the fourth spindle 400, so as to indicate a standard rotation angle of the stopping arm 30 relative to the linkage rod 50 when the stopping arm 30 rotates from the first position to the second position. This standard rotation angle may be implemented by adjusting, based on a value of the standard rotation angle of the stopping arm 30 relative to the linkage rod 50, a rotation angle of the first pointer 41 relative to a bottom edge 401 of the angle detector 40.

When the linkage rod 50 drives the first sub-arm 31 to rotate, the first sub-arm 31 rotates about the third spindle 300, and the rotation of the first sub-arm 31 drives the second point 42 to rotate about the third spindle 300. Thus, a rotation angle of the second pointer 42 may indicate an actual rotation angle of the first sub-arm 31 relative to the linkage rod 50.

If positions of the first pointer 41 and the second pointer 42 of the angle detector 40 are arranged as above, when the stopping arm 30 is arranged at the first position, i.e., when the stopping device 1 is in the first state (the standby state) and the second sub-arm 32 is not protruded, an angle indicated by the second pointer 42 is smaller than that indicated by the first pointer 41. When the stopping arm 30 is arranged at the second position, i.e., when the stopping device 1 is in the second state (a working state) and the second sub-arm 32 is protruded, the second pointer 42 is rotated. If a difference between the rotation angle indicated by the second pointer 42 and the angle indicated by the first pointer 41 may be within a predetermined range, it means the stopping device 1 operates normally. If the stopping device 1 does not operate normally due to mechanical interference or other faults, the difference between the rotation angle indicated by the second pointer 42 and the angle indicated by the first pointer 41 may go beyond the predetermined range. Hence, the state of the stopping device 1 may be determined in accordance with the rotation angle indicated by the second pointer 42.

Optionally, the stopping device of the embodiments of the present disclosure may further include an alarm 60, and a position sensor 410 may be arranged on the first pointer 41 and configured to detect a position of the second pointer 42. When the stopping device 1 is in the working state, the position sensor 410 may detect the position of the second pointer 42, and if the angle between the second pointer 42 and the first pointer 41 goes beyond the predetermined range, the position sensor 410 may output a triggering signal to the alarm 60, so as to implement automatic warning when abnormality occurs.

Optionally, the angle detector 40 may further include a third pointer 43 fixedly connected to the linkage rod 50. When the driving structure 20 drives the linkage rod 50 to move, the third pointer 43 may synchronously rotate about the third spindle 300. The third pointer 43 may be used to indicate a rotation angle of the linkage rod 50 when the stopping arm 30 rotates from the first position to the second position.

The stopping device 1 provided in the embodiments of the present disclosure converts an elevation movement of the stopping device in the related arts into a rotation movement in a plane in the present disclosure. As compared with the stopping device in the related arts, no additional room is needed for installing the stopping device of the elevation type in the embodiments of the present disclosure. In addition, because the stopping device may move gradually into the conveying region, no interference may be caused to the object being conveyed. Further, automatic detection of states of the stopping arm 30 and warning may also be implemented in the stopping device 1, thereby to detect the abnormality and prevent accidents from happen.

The present disclosure further provides a conveyor system 3000 in some embodiments. The conveyor system 3000 includes the above-mentioned stopping device 1 and a plurality of conveying structures 3010 for conveying an object. The stopping device 1 is arranged under the plurality of conveying structures 3010. A detailed structure of the stopping device 1 may be obtained by referring to the above description, and thus will not be particularly described herein. In addition, a position and an installation of the stopping device relative to the plurality of conveying structures may be easily known by those skilled in the art, and thus will not be particularly described herein.

The above are optional embodiments of the present disclosure. It should be noted that a person skilled in the art may make numerous modifications and improvements without departing from the principles of the present disclosure, and these modifications and improvements shall also fall within the scope of the present disclosure.

What is claimed is:

1. A stopping device for a conveying process of an object, comprising:
    a pedestal;
    a driving structure rotatably connected to the pedestal through a first spindle;
    a stopping arm rotatably connected to the pedestal through a second spindle;
    a linkage rod connected between the driving structure and the stopping arm; and
    an angle detector arranged at a position where the linkage rod is connected to the stopping arm and comprising a first pointer and a second pointer,
    wherein the driving structure is configured to drive the linkage rod to move, so that the linkage rod drives the stopping arm to rotate about the second spindle between a first position and a second position,
    the linkage rod is rotatably connected to the stopping arm through a third spindle, the first pointer is arranged to be in one of a first state and a second state, and in the first state, the first pointer is fixed onto a fourth spindle, and in the second state, the first pointer is rotatable about the fourth spindle,
    the second pointer is fixedly connected to the stopping arm, and in the case that the linkage rod drives the stopping arm to rotate about the second spindle between the first position and the second position, the second pointer synchronously rotates about the fourth spindle.

2. The stopping device according to claim 1, wherein the driving structure comprises a cylinder, and the linkage rod is fixedly connected to a piston of the cylinder.

3. The stopping device according to claim 1, wherein the stopping arm comprises a first sub-arm and a second sub-arm between which an angle is formed, and the second spindle is arranged at a position where the first sub-arm is connected to the second sub-arm.

4. The stopping device according to claim 3, wherein the angle is larger than 90 degrees.

5. The stopping device according to claim 4, wherein the angle is 135 degrees.

6. The stopping device according to claim 3, wherein an end of the first sub-arm away from the second sub-arm is rotatably connected to the linkage rod through the third spindle.

7. The stopping device according to claim 3, wherein the number of the linkage rod is one;
    an axis of a body of the linkage rod is an identical straight line; and
    in the case that the stopping arm is located at the first position, the second sub-arm is in a first state in which the second sub-arm is parallel to the linkage rod, and in the case that the stopping arm is located at the second position, the second sub-arm is in a second state in which the second sub-arm is perpendicular to the second sub-arm in the first state.

8. The stopping device according to claim 1, further comprising an alarm, wherein a position sensor is arranged on the first pointer; and
    in the case that a difference between an angle indicated by the second pointer and an angle indicated by the first pointer is larger than a predetermined angle value, the position sensor outputs a triggering signal to the alarm.

9. The stopping device according to claim 1, wherein the angle detector further comprises a third pointer fixedly connected to the linkage rod, and in the case that the driving structure drives the linkage rod to move, the third pointer synchronously rotates about the fourth spindle.

10. The stopping device according to claim 1, wherein an axis of the third spindle coincides with an axis of the fourth spindle.

11. A conveyor system, comprising:
    a plurality of conveying structures for conveying an object, and
    the stopping device according to claim 1.

12. The stopping device according to claim 2, wherein the linkage rod is rotatably connected to the stopping arm through a third spindle.

13. The stopping device according to claim 4, wherein an end of the first sub-arm away from the second sub-arm is rotatably connected to the linkage rod through the third spindle.

14. The stopping device according to claim 4, wherein the number of the linkage rod is one;
    an axis of a body of the linkage rod is an identical straight line; and
    in the case that the stopping arm is located at the first position, the second sub-arm is in a first state in which the second sub-arm is parallel to the linkage rod, and in the case that the stopping arm is located at the second position, the second sub-arm is in a second state in which the second sub-arm is perpendicular to the second sub-arm in the first state.

15. The stopping device according to claim 8, wherein the angle detector further comprises a third pointer fixedly connected to the linkage rod, and in the case that the driving structure drives the linkage rod to move, the third pointer synchronously rotates about the fourth spindle.

16. The stopping device according to claim 8, wherein an axis of the third spindle coincides with an axis of the fourth spindle.

17. A conveyor system, comprising:
a plurality of conveying structures for conveying an object, and
the stopping device according to claim 2.

* * * * *